Dec. 25, 1951     C. E. DAVIS     2,579,554
TRANSMISSION
Filed May 1, 1944     2 SHEETS—SHEET 1
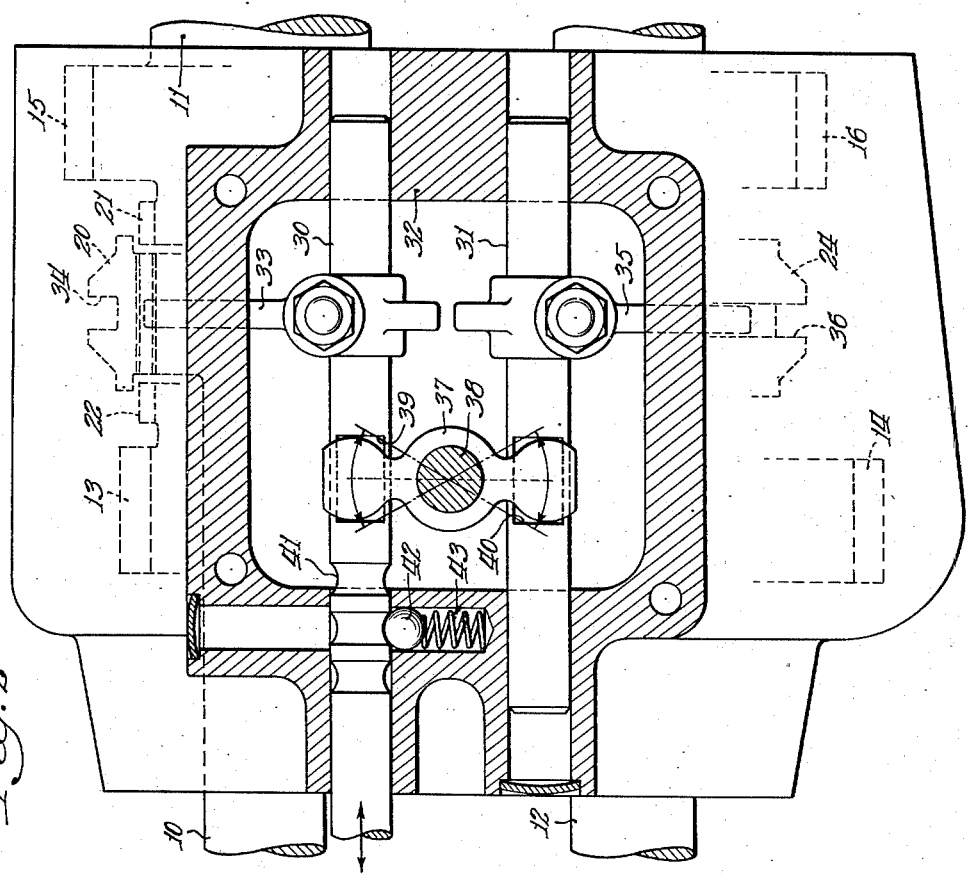
Inventor:
Charles E. Davis

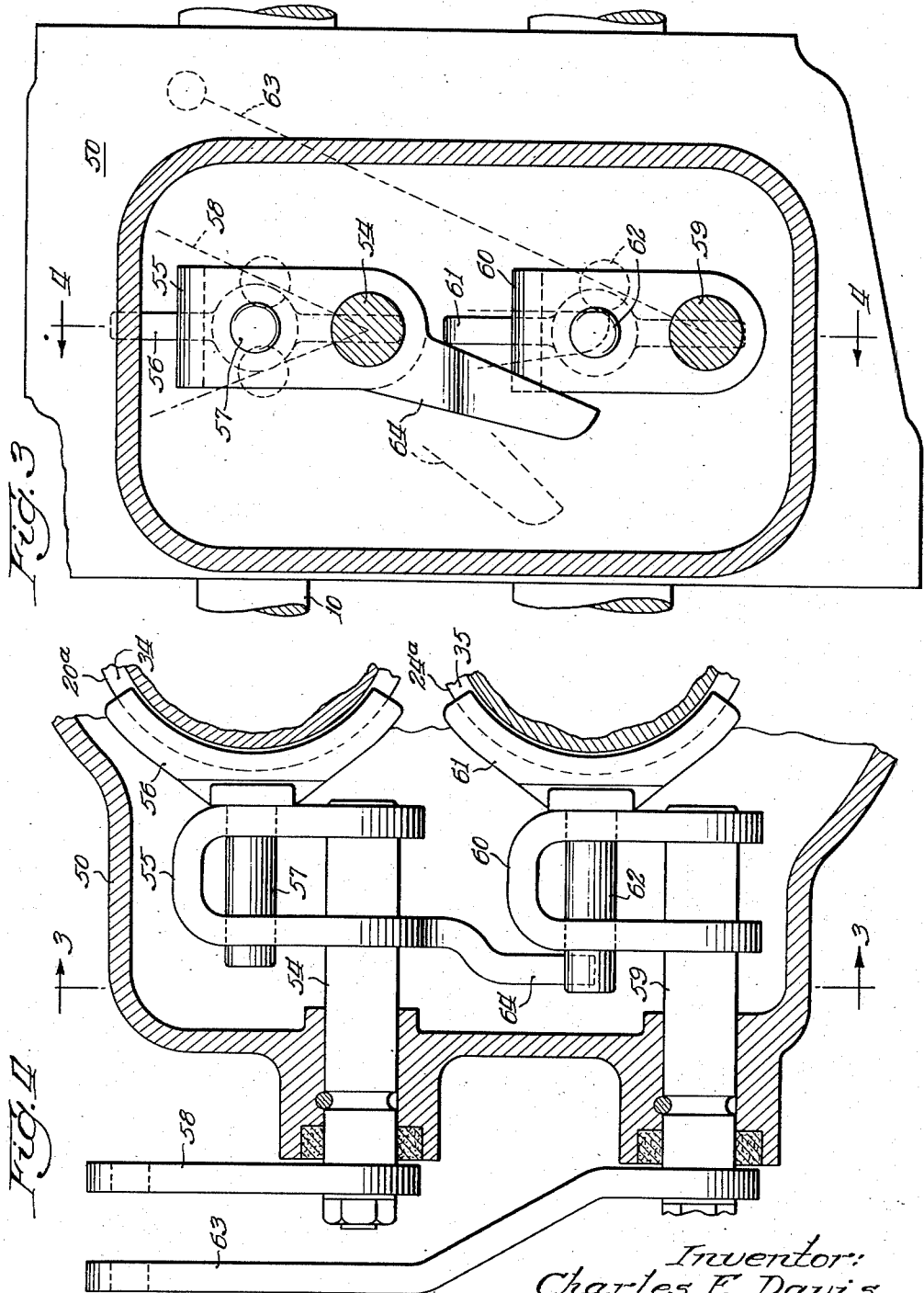

Patented Dec. 25, 1951

2,579,554

UNITED STATES PATENT OFFICE 2,579,554

TRANSMISSION

Charles E. Davis, Muncie, Ind., assignor to Borg-Warner Corporation, Chicago, Ill., a corporation of Illinois Application May 1, 1944, Serial No. 533,524

8 Claims. (Cl. 74—359)

My invention relates to transmissions for motor vehicles and more particularly to transfer assembly transmissions by means of which both the front and rear wheels of a vehicle may be driven.

It is an object of my invention to provide an improved transfer assembly which may be selectively controlled to provide a low and a high speed ratio, and more particularly it is an object to provide an improved control arrangement in such a transfer assembly whereby when the assembly is set to provide the low speed ratio, a drive of both the front and rear wheels of the vehicle is compelled.

It is another object of my invention to provide an embodiment of the transfer assembly and control arrangement wherein the control arrangement functions, in addition to compelling the front and rear wheel drive at low speed ratio, to assure a drive only to the rear wheels of the vehicle when the transmission is set for high speed ratio.

It is a further object of my invention to provide an embodiment of the invention in which the front wheels of the vehicle may selectively be driven or allowed to idle at the will of the operator when the transmission is conditioned for high speed ratio but both the front and rear wheel drive is compelled when the transmission is conditioned for low speed ratio.

The invention consists of the novel constructions, arrangements and devices to be hereinafter described and claimed for carrying out the above stated objects and such other objects as will appear from the following description of certain preferred embodiments illustrated in the accompanying drawings, wherein:

Fig. 1 is a diagrammatic illustration of a transfer assembly transmission with which my improved control arrangement may be used;

Fig. 2 is a sectional view through a case for the transmission illustrated in Fig. 1 and showing one embodiment of my improved transmission control arrangement;

Fig. 3 is a sectional view, taken on line 3—3 of Fig. 4, through a case for the transmission illustrated in Fig. 1 and showing another embodiment of the invention;

Fig. 4 is a sectional view taken on line 4—4 of Fig. 3; and

Fig. 5 is a sectional view through certain clutch structure which may be used with the embodiment of the invention shown in Figs. 3 and 4.

Like characters of reference designate like parts in the several views.

Referring now in particular to Fig. 1 of the drawings, there is illustrated diagrammatically a transfer assembly transmission for a motor vehicle and which comprises a drive shaft 10, a driven shaft 11 and a second driven shaft 12. The drive shaft 10 is adapted to be driven by the motor (not shown) of the vehicle in which the transmission is installed, and, if desired, an ordinary change speed transmission (not shown) may be installed between the shaft 10 and the motor. The shaft 11 is adapted to be connected to drive the rear wheels (not shown) of the vehicle, and the shaft 12 is adapted to be connected to drive the front wheels (not shown) of the vehicle. The shaft 10 is piloted in the shaft 11, as shown, and the shaft 10 has a gear 13 rotatably disposed thereon which is in mesh with a larger gear 14 fixed on the shaft 12. The shaft 11 has a gear 15 fixed thereto, and this gear is in mesh with a gear 16 of the same size which is rotatably disposed on the shaft 12.

A clutch 17 is provided for positively connecting the shaft 10 with the gear 15 or with the gear 13, and a clutch 18 is provided for positively connecting the shaft 12 with the gear 16. The clutch 17 comprises an enlarged portion 19 on the shaft 10 which is splined on its outer periphery and a clutch sleeve 20 splined on its inner surface and which is thereby slidably and non-rotatably disposed on the shaft portion 19. The gear 15 is provided with clutch teeth 21, and the gear 13 is provided with clutch teeth 22. The splines in the clutch sleeve 20 are adapted to intermesh with the teeth 21 to clutch the shaft 10 and gear 15 together, and the splines of the member 20 are adapted also to intermesh with the teeth 22 to clutch the shaft 10 and gear 13 together. The clutch 18 comprises an enlarged portion 23 on the shaft 12 having a clutch sleeve 24 splined thereto, and these parts are similar to the parts 19 and 20 of the clutch 17. The gear 16 is provided with teeth 25 with which the internally splined clutch sleeve 24 is adapted to intermesh for clutching the shaft 12 and gear 16 together.

In the operation of the illustrated transmission, when the clutch sleeve 20 is interengaged with the teeth 21, the shaft 11 is driven in direct drive from the shaft 10 through the clutch 17. If the clutch 18 is in neutral condition as shown in Fig. 1, the shaft 12 is not driven and may idle. With the clutch 17 being so engaged, if the clutch 18 is moved to engaged position to couple together the gear 16 and shaft 12, then the shaft 12 is driven from the shaft 10 at the same speed as the shaft 11 through the gears 15 and 16, due to the fact that these gears are of the same size. When the clutch 17 is shifted to its other operative position in which the sleeve 20 intermeshes with the teeth 22, and if the clutch 18 is in its operative position in which the sleeve 24 intermeshes with the teeth 25, both of the driven shafts 11 and 12 are driven at the same reduced speed with respect to the shaft 10. The drive is from the shaft 10, through the clutch 17 to the gear 13, and through the two gears 13 and 14 to the shaft 12 which is thereby driven at reduced speed with respect to the shaft 10 due to the fact that the gear 13 is smaller than the gear 14. The clutch 18 being in operative position couples the shaft 12 with the gear 16, and there is a drive through the gears 16 and 15 to the shaft 11 so that the shaft 11 is driven at the same reduced speed as the shaft 12.

Referring now in particular to Fig. 2, there is illustrated an improved arrangement for controlling the transmission shown in Fig. 1 and which comprises a pair of shift rods 30 and 31 slidably disposed in a casing 32 for the transmission. The rod 30 carries a fork 33 which fits in a circumferential groove 34 provided in the clutch sleeve 20, and the rod 31 carries a fork 35 which fits in a circumferential groove 36 provided in the clutch sleeve 24. The clutch sleeves 20 and 24 are thereby moved by movement of the shift rods 30 and 31.

The shift rods 30 and 31 are interconnected by means of a walking beam 37 which is rotatably mounted on a stud 38 fixed with respect to the transmission casing 32 by any suitable means (not shown). The rod 30 is provided with a slot 39 and the rod 31 is provided with a slot 40 in the sides of the rods, and the opposite ends of the walking beam 37 fit in the slots as shown. The walking beam 37 so interconnects the rods 30 and 31 that when the rod 30 is moved in one direction, the beam 37 moves the rod 31 in the opposite direction, as is apparent.

Yieldable detent means is preferably provided for the rods 30 and 31. The detent means comprises three grooves 41 provided in the rod 30 and a ball 42 and a spring 43 acting on the ball disposed in a suitable cavity in the casing 32. The ball 42 is disposed to enter into any of the grooves 41, and the grooves are so disposed in the rod 30 that the central groove yieldably holds the clutch sleeve 20 in its neutral position while the end grooves yieldably hold the clutch sleeve in either of its operative positions interengaged with either the teeth 21 or the teeth 22.

The two rods 30 and 31 are moved simply by moving the rod 30, and the beam 37 functions to move the rod 31 simultaneously with the rod 30. When the rod 30 is in its position as shown in Fig. 2, both of the sleeves 20 and 24 are in their neutral positions as they are shown in Fig. 1. When the rod 30 is moved to the left as seen in Fig. 2, the sleeve 20 is interengaged with the teeth 22 and the sleeve 24 is interengaged with the teeth 25 due to the movement of the rod 31 by the beam 37. This movement of the clutch sleeve 20 makes the gears 13 and 14 operative to drive the shaft 12 at reduced speed, and this movement of the clutch sleeve 24 operably connects the shafts 11 and 12 to rotate at the same speed by means of the gears 15 and 16. The beam 37 thus functions to compel a drive of both of the driven shafts 11 and 12 at the reduced speed. When the rod 30 is moved to the right as seen in Fig. 2, the clutch sleeve 20 is interengaged with the teeth 21, and the clutch sleeve 24 is moved to the left as seen in Fig. 1 to be out of engagement with the teeth 25. This movement of the sleeve 20 provides direct drive between shafts 10 and 11, and the shaft 12 is disconnected from shaft 11 since the clutch 18 is disengaged. Thus, due to the interconnection between the rods by the beam 37 fitting in the slots 39 and 40, only the driven shaft 11 and not the driven shaft 12 may be driven in direct drive with the drive shaft 10. The interconnection between the shift rods 30 and 31 thus assures that when increased power is needed to drive the vehicle, this power is distributed through both of the driven shafts 11 and 12 and both the front and rear wheels of the vehicle are driven, while when less power is needed to drive the vehicle, all of the power passes through the driven shaft 11 and the rear wheels of the vehicle.

Another arrangement for controlling a transmission of the type shown in Fig. 1 is illustrated in Figs. 3, 4, and 5 of the drawings. The transmission controlled by this arrangement is the same as is shown in Fig. 1 with the exception that it has a casing 50 of a slightly different shape and the yieldable detent means for the shiftable clutch sleeves are provided within the clutch sleeves rather than on some movable member connected with the clutch sleeves. The detent means for the clutch sleeves 20a (see Figs. 4 and 5) of the positive clutch 17a, corresponding to the parts 20 and 17 in the Fig. 1 illustration, comprises a ball 51 and a spring 52 bearing on the ball which are disposed in a suitable cavity in the enlarged portion 19a of a shaft 10 which corresponds with the portion 19 shown in Fig. 1. The clutch sleeve 20a is provided with slots 53 therein with which the ball 51 is adapted to cooperate, and the detent means comprising the ball and the slots functions to yieldably hold the clutch sleeve 20a in either of its operative positions in mesh with the teeth 21 or 22 or in its neutral position. Similar detent means may be provided for the clutch sleeve 24a (see Fig. 4) corresponding to the clutch sleeve 24 for yieldingly holding the sleeve 24a either in neutral or in engaged position with the teeth 25.

The transmission control arrangement shown in Figs. 3 to 5 comprises a shaft 54 rotatably disposed in the transmission casing 50. The shaft 54 has fixed on its inner end a yoke member 55, and a collar 56 is carried by the member 55 by means of a stud 57 fixed with respect to the collar and extending through the sides of the yoke member. The collar is disposed in the peripheral groove 34 in the sleeve 20a, and the sleeve may be shifted by the collar. The shaft 54 on its outer end has fixed thereto a control lever 58 for rotating the shaft 54 as desired for shifting the yoke member and collar and thereby the clutch sleeve 20a.

The sleeve 24a on the shaft 12 is moved by means of a shaft 59 rotatably journalled in the case 50 below the shaft 54. The shaft 59 has a yoke member 60 fixed thereto, and a collar 61 is carried by the yoke member by means of a stud 62 fixed with respect to the collar and extending through the sides of the yoke member 60. The shaft 59 has fixed thereto on its outer end a control lever 63 for rotating the shaft 59 as desired for shifting the yoke member, collar, and clutch sleeve.

The shafts 54 and 59 and the control levers 58 and 63 are interconnected by means of a tang portion 64 provided on the yoke member 55. The tang portion 64 extends downwardly and is adapted to contact the outer end of the stud 62 when the shaft 54 is given movement in the counterclockwise direction as seen in Fig. 3.

In the operation of the control arrangement shown in Figs. 3 to 5, when the control lever 58 is moved in a clockwise direction as seen in Fig. 3, the clutch sleeve 20a is moved to interengage with the teeth 21 to directly connect the shafts 10 and 11. If the clutch sleeve 24a is allowed to remain in its neutral position, only the shaft 11 will be driven in direct drive; however, if the sleeve 24a is moved to interengage with the teeth 25 by a clockwise movement of the control lever 63, as seen in Fig. 3, then the shaft 12 is also driven at the same speed as the shaft 11. Thus, with this control arrangement, either the shaft 11 may be driven alone in direct drive or both of the driven shafts 11 and 12 may optionally be driven at this speed ratio. It will be noted that the arrangement of the tang portion 64 and the stud 62 is such that when the shaft 54 is rotated in the clockwise direction as seen in Fig. 3, the tang does not effect any movement of the stud 62 and thereby of the clutch sleeve 24a.

When the shaft 54 is moved in a counterclockwise direction, as seen in Fig. 3, by means of its control lever 58, the clutch sleeve 20a is interengaged with the teeth 22, and the shaft 10 is thereby connected to drive the shaft 12 at reduced speed through the gears 13 and 14. With such movement of the shaft 54, the tang portion 64 cooperates with the stud 62 to move the stud and the shaft 59 in a clockwise direction to interengage the clutch sleeve 24a with the teeth 25. The driven shaft 11 is thereby connected with the shaft 12 through the gears 16 and 15, and thus when a drive in reduced speed is initiated by means of the control lever 58, a drive through the driven shaft 11 is compelled along with the drive through the driven shaft 12. This control arrangement in this respect thus operates similarly to the control arrangement illustrated in Fig. 2, whereby both of the driven shafts 11 and 12 but neither of the driven shafts separately may be driven at reduced speed ratio.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a transfer assembly for a motor vehicle, the combination of a drive shaft adapted to be driven by the motor of the vehicle, a driven shaft adapted to drive the front wheels of the vehicle, a driven shaft adapted to drive the rear wheels of the vehicle, a pair of clutches and a set of gearing, one of said clutches having an operative position for directly connecting said drive shaft and one of said driven shafts and having another operative position for completing a power train through the gearing to drive one of the driven shafts at reduced speed, said other clutch having an operative position for completing a power train through the gearing to connect the two driven shafts to rotate together, and means interconnecting said two clutches whereby when said first named clutch is shifted to complete said reduced speed power train through the gearing, said second named clutch is moved to its operative position to connect the two driven shafts to rotate together.

2. In a transfer assembly for a motor vehicle, the combination of a drive shaft adapted to be driven by the motor of the vehicle, a driven shaft adapted to drive the front wheels of the vehicle, a driven shaft adapted to drive the rear wheels of the vehicle, gearing adapted to drive one of said driven shafts at a reduced speed from said drive shaft, gearing for connecting said two driven shafts to rotate at the same speed, a clutch in one position connecting said drive shaft and one of the driven shafts in direct drive and in another position completing a power train through said first named gearing, a clutch for rendering said second named gearing operative, and means interconnecting said clutches whereby for shifting said second named clutch to operative position when said first named clutch is moved to its second named position.

3. In a transfer assembly for a motor vehicle, the combination of a drive shaft adapted to be driven by the motor of the vehicle, a driven shaft adapted to drive the front wheels of the vehicle, a driven shaft adapted to drive the rear wheels of the vehicle, selectively controlled gearing in the assembly for providing a low and a high speed ratio between said driving shaft and said second named driven shaft, said gearing also being capable of providing a low speed ratio between said drive shaft and said first named driven shaft, and control means movable to a first position for effecting a drive through said second named driven shaft at said high speed ratio and movable to a second position for effecting a drive through said first named driven shaft at said low speed ratio, said control means including means automatically effective upon movement of the control means to its said second position for simultaneously compelling a drive through said second named driven shaft at said low speed ratio.

4. In a transfer assembly for a motor vehicle, the combination of a drive shaft adapted to be driven by the motor of the vehicle, a driven shaft adapted to drive the front wheels of the vehicle, a driven shaft adapted to drive the rear wheels of the vehicle, a pair of clutches and a set of gearing, one of said clutches having an operative position for directly connecting said drive shaft and one of the driven shafts and having another operative position for completing a power train through the gearing to drive one of the driven shafts at reduced speed, said other clutch having an operative position for completing a power train through the gearing to connect the two driven shafts to rotate together, and means interconnecting said two clutches for shifting said second named clutch to its operative position to connect the two driven shafts to rotate together when said first named clutch is moved to its second named operative position for completing said reduced speed power train and said interconnecting means functioning to move said second named clutch to inoperative position when said first named clutch is moved to its first named position for directly connecting said drive shaft and one of said driven shafts.

5. In a transfer assembly for a motor vehicle, the combination of a drive shaft adapted to be driven by the motor of the vehicle, a driven shaft adapted to drive the front wheels of the vehicle, a driven shaft adapted to drive the rear wheels of the vehicle, gearing adapted to drive one of said driven shafts at a reduced speed from said driving shaft, gearing for connecting said two driven shafts to rotate at the same speed, a clutch in one position connecting said drive shaft and one of said driven shafts in direct drive and in another position completing a power train through said first named gearing, a clutch for rendering said second named gearing operative, each of said clutches being controlled by means of a shift rod, and a walking beam interconnecting said shift rods whereby for shifting said second named clutch to operative position when said first named clutch is moved to its second named position and for shifting said second named clutch to inoperative position when said first named clutch is moved to its first named position.

6. In a transfer assembly for a motor vehicle, the combination of a drive shaft adapted to be driven by the motor of the vehicle, a driven shaft adapted to drive the front wheels of the vehicle, a driven shaft adapted to drive the rear wheels of the vehicle, a pair of clutches and a set of gearing, one of said clutches having an operative position for directly connecting said drive shaft and one of the driven shafts and having another operative position for completing a power train through the gearing to drive one of the driven shafts at reduced speed, said other clutch having an operative position for completing a power train through the gearing to connect the two driven shafts to rotate together, and means interconnecting said clutches functioning to shift said second named clutch to operative position when said first named clutch is moved to its second named position and having a lost motion connection with respect to one of the clutches whereby said second named clutch may be moved in or out of operative position when said first named clutch is moved to its first named position.

7. In a transfer assembly for a motor vehicle, the combination of a drive shaft adapted to be driven by the motor of the vehicle, a driven shaft adapted to drive the front wheels of the vehicle, a driven shaft adapted to drive the rear wheels of the vehicle, gearing adapted to drive one of said driven shafts at a reduced speed from said drive shaft, gearing for connecting said two driven shafts to rotate at the same speed, a clutch in one position connecting said drive shaft and one of the driven shafts in direct drive and in another position completing a power train through said first named gearing, a clutch for rendering said second named gearing operative, a rotatable clutch shifting member for moving said first named clutch between its two operative positions, and interconnecting means between said clutches including a lever on said rotatable member adapted to move said second named clutch in only one direction toward its operative position, said interconnecting means functioning to shift said second named clutch to operative position when said first named clutch is moved to its second named position and permitting free movement of said second named clutch when said first named clutch is moved to its first named position whereby said second named clutch may selectively be moved to operative or inoperative position in this position of said first named clutch.

8. In a transfer assembly for a motor vehicle, the combination of a drive shaft adapted to be driven by the motor of the vehicle, a driven shaft adapted to drive the front wheels of the vehicle, a driven shaft adapted to drive the rear wheels of the vehicle, selectively controlled gearing in the assembly for providing a low and a high speed ratio between said drive and driven shafts, control means movable to a first position for effecting a drive through said second named driven shaft at said high speed ratio and movable to a second position to effect a drive through said first named driven shaft at said low speed ratio, said control means including means automatically effective upon movement of the control means to its said second position for simultaneously compelling a drive through said second named driven shaft at said low speed ratio, and a second control means selectively operable while said first named control means occupies its said first position for simultaneously compelling a drive through said first named driven shaft at said high speed ratio.

CHARLES E. DAVIS.

REFERENCES CITED

The following references are of record in the file of this patent:

UNITED STATES PATENTS

| Number | Name | Date |
|---|---|---|
| 954,531 | Mack | Apr. 12, 1910 |
| 959,878 | Page | May 31, 1910 |
| 1,430,526 | Asprooth | Oct. 3, 1922 |
| 2,174,187 | Freitag | Sept. 26, 1939 |
| 2,256,974 | Dondlinger | Sept. 23, 1941 |
| 2,357,781 | Randol | Sept. 5, 1944 |
| 2,397,587 | Armantrout | Apr. 2, 1946 |
| 2,475,803 | Probst | July 12, 1949 |

OTHER REFERENCES

"The Autocar," July 23, 1943, issue, pages 532, 533, and 534.

Willys Model "MB" ¼-Ton 4 x 4 Government truck, May 15, 1942, TM-10-1513, pages 0800-79, 0800-80, 0800-81.